United States Patent
Raghuraman et al.

(10) Patent No.: US 8,718,053 B2
(45) Date of Patent: May 6, 2014

(54) PACKET TRANSPORT FOR NETWORK DEVICE CLUSTERS

(75) Inventors: Ramanan Raghuraman, San Jose, CA (US); Rajan Sharma, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 345 days.

(21) Appl. No.: 12/945,118

(22) Filed: Nov. 12, 2010

(65) Prior Publication Data

US 2012/0120949 A1    May 17, 2012

(51) Int. Cl.
    *H04L 12/28*    (2006.01)
(52) U.S. Cl.
    USPC ...................................................... 370/389
(58) Field of Classification Search
    None
    See application file for complete search history.

(56) References Cited

U.S. PATENT DOCUMENTS

| | | | |
|---|---|---|---|
| 6,336,119 B1 | 1/2002 | Banavar et al. | |
| 6,636,499 B1 * | 10/2003 | Dowling | 370/338 |
| 6,839,348 B2 | 1/2005 | Tang et al. | |
| 7,126,941 B1 | 10/2006 | Clemm et al. | |
| 7,130,305 B2 | 10/2006 | Kuukankorpi et al. | |
| 2003/0002494 A1 * | 1/2003 | Kuukankorpi et al. | 370/386 |
| 2005/0063395 A1 | 3/2005 | Smith et al. | |
| 2005/0066216 A1 | 3/2005 | Hebbar et al. | |
| 2005/0207414 A1 | 9/2005 | Duvvury | |
| 2006/0221967 A1 * | 10/2006 | Narayan et al. | 370/392 |
| 2009/0310610 A1 * | 12/2009 | Sandstrom | 370/392 |

* cited by examiner

*Primary Examiner* — Ayaz Sheikh
*Assistant Examiner* — Nicholas Sloms
(74) *Attorney, Agent, or Firm* — Brinks Gilson & Lione

(57) ABSTRACT

In one implementation, a cluster of network devices forwards packets within the cluster according to a node vector and a cluster database. The cluster database defines a path from each network device in the cluster to every other network device in the cluster. When a packet is received, the receiving network device accesses a forwarding database for egress ports according to a destination address of the packet and accesses the cluster database to identify a first cluster link in the path from the receiving network device to the egress network device. The receiving network device adds a node vector to the packet. The node vector communicates to subsequent network devices how the packet is to be forwarded through the cluster on the path from the receiving network device to the egress network device. The node vector is specific to the network device cluster and operates independent from packet forwarding protocols.

19 Claims, 7 Drawing Sheets

PACKET TRANSPORT FOR NETWORK DEVICE CLUSTERS

FIELD

The present embodiments relate to packet transport in network device clusters.

BACKGROUND

Network device clusters group a plurality of network devices to operate as a single logical entity from a management standpoint. When conventional forwarding tables alone are relied upon for packet transport within the network device cluster, problems such as loops and packet duplication may arise. Loops occur when a packet loops between the same series of network devices. Duplication occurs when a network device receives multiple copies of a packet.

DETAILED DESCRIPTION

Overview

Figure 1A:
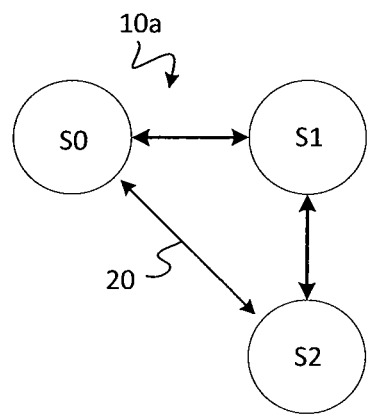
FIGS. 1A-1F illustrate some possible topologies of a network device cluster.

In a network device cluster, a link management layer builds a source-based tree for each network device according to the topology of the network device cluster and stores the routing information in a cluster database. This defines a unique path from each network device to any other network device. As packets come into the network device cluster, a node vector is added to the packets. The bits of the node vector control how the packet will be forwarded by subsequent network devices in the network device cluster. The node vector forwarding scheme is independent from packet forwarding protocols and can adapt easily to changes in the topology of the network device cluster.

In one aspect, a method includes, receiving a packet at a node of a network device cluster, accessing a forwarding database for at least one egress port according to a destination address of the packet, accessing a cluster database to identify a cluster link associated with the at least one egress port, and appending a node vector to the packet, wherein the node vector is based on the cluster link and specifies subsequent forwarding decisions for the packet.

In a second aspect, a network device includes an ingress port, a forwarding database, a cluster database, and a controller. The ingress port of a network device cluster is configured to receive a packet including a destination address. The forwarding database is configured to index at least one egress port according to the destination address. The cluster database is configured to index at least one cluster link associated with the at least one egress port. The controller is configured to access the forwarding database and the cluster database to append a node vector to the packet, and the node vector is based on the cluster link and specifies subsequent forwarding nodes of the network device cluster.

In a third aspect, one or more computer readable storage media encoded with software comprising computer executable instructions and when the software is executed operable to receive a packet at a node of a network device cluster, access a cluster database to identify a cluster link, wherein the cluster database defines a path to an egress port of the network device cluster from the node, and append a node vector to the packet, wherein the node vector prevents more than one copy of the node vector from reaching the egress port.

EXAMPLE EMBODIMENTS

A network device cluster, which may also be referred to as a superswitch or a virtual switch, is made up of a group of network devices. One example group of network devices includes a group of routers, switches, bridges, and/or hubs. The network device cluster operates as a single logical entity. Many topologies for the network device cluster are possible. A packet enters the network device cluster at an ingress port of one of the network devices. The network device replicates the packet and forwards the packets to one or more egress ports of the other network devices depending on the intended destination of the packet according to a forwarding table.

Before forwarding the packet, the network device adds a node vector to the packet. The node vector is based on the particular topology of the network device cluster. Subsequent network devices decide whether to discard or forward the packet according to the node vector. This technique allows the forwarding of packets within the network device cluster without the risk of any of the network devices receiving more than one copy of the packet. Thus, the technique eliminates packet loops or packet duplication in network device clusters.

The network devices of the cluster may be at the same location or distributed across an organization. The network device cluster may include aggregation switches deployed for redundancy. The network device cluster may include a commander network device and at least one member network device. Communication with the network device cluster may be through a single internet protocol (IP) address assigned to the commander network device.

FIGS. 1A-1F illustrate some possible topologies of a network device cluster. FIG. 1A illustrates a network device cluster 10a including three network devices, which also may be referred to as nodes. The network device cluster 10a is a full mesh topology because every node is connected to every other node and also a ring topology because every node is connected to exactly two other nodes. The nodes are connected by communication link 20, which may be referred to as a switch interconnect link (SIL or SIL link). The SIL link has a unique SIL link ID, which may be defined using any numbering scheme as set by the administrator or commander network device. In addition, each node has a node ID (e.g., S0, S1, and S2). The node IDs and the SIL link IDs are specific to the network device cluster and not used outside of the network device cluster for the given cluster.

Figure 1B:
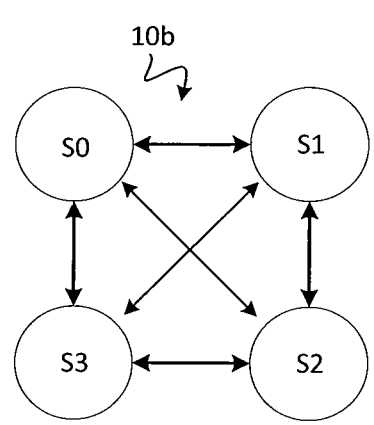
Figure 1C:
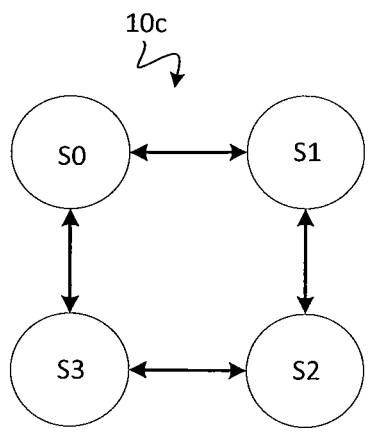

FIG. 1B illustrates a network device cluster 10b having four nodes S0, S1, S2, and S3. For ease of illustration, the communication links are not labeled. The network device cluster 10b is a full mesh topology. FIG. 1C illustrates a network device cluster 10c having four nodes arranged in ring topology because every node is connected to exactly two nodes. A valid topology is an arrangement of nodes and communication link that results in a network device cluster in which a packet arriving at any network device may reach any other network device. In addition to the ring topology, several partial ring topologies, in which one communication link is missing or has otherwise failed, are also valid topologies.

Figure 1D:
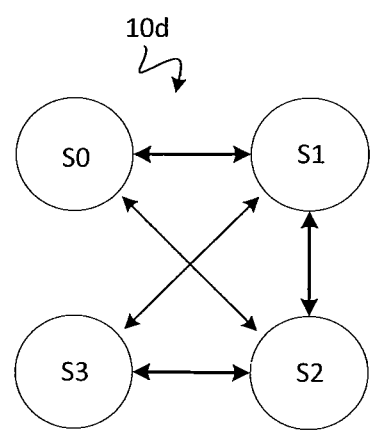

FIG. 1D illustrates a network device cluster 10d having four nodes arranged in a partial mesh topology. A partial mesh topology often results when one or more communication links of a full mesh topology fail or are otherwise unavailable. Ring topologies and partial ring topologies may also be considered partial mesh topologies.

Figure 1E:
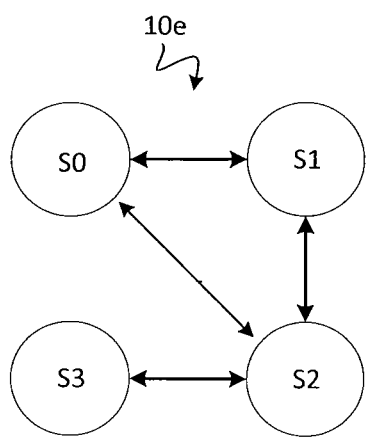
Figure 1F:
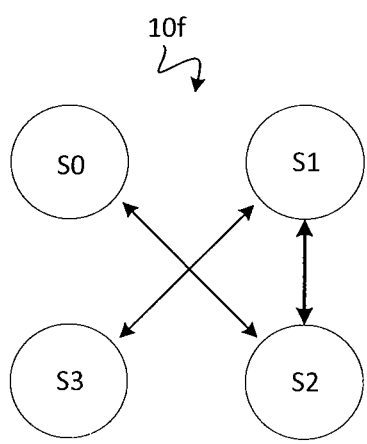
Figure 2A:
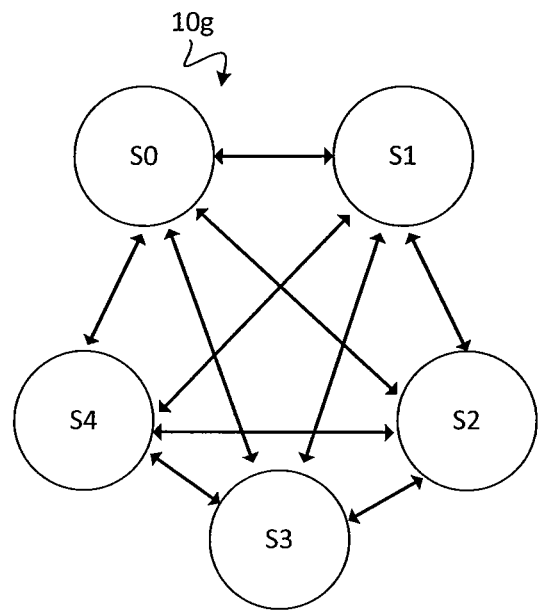
FIG. 2A illustrates an example five-node network cluster.
Figure 2B:
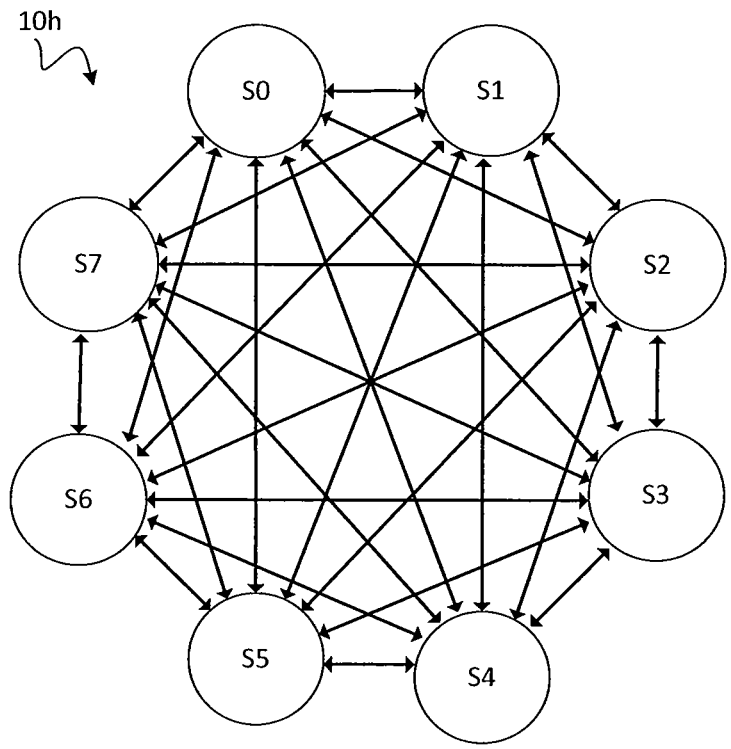
FIG. 2B illustrates an example eight-node network cluster.

FIGS. 1E and 1F illustrate additional partial mesh topologies of network device clusters 10e and 10f. FIG. 2A illustrates a network device cluster 10g having five nodes S0-S4. FIG. 2B illustrates a network device cluster 10h having eight nodes S0-S7. As evident to one of ordinary skill in the art, approximately 150 partial mesh topologies are possible with four nodes and up to six communication links. That number grows exponentially to thousands of possible topologies in the case of five nodes and up to ten communication links, as shown in FIG. 2A, and billions of possible topologies in the case of eight nodes and up to 28 communication links, as shown in FIG. 2B. Any number of nodes and/or links is possible.

Regardless of the number of nodes, the network devices are equipped with a map of the topology. The map may be stored in text format in the form of a cluster table. The cluster table matches the network devices of the cluster to their egress ports. The cluster table also defines a route from each of the network devices to each of the other network devices by matching each of the other network devices to an SIL link. Alternatively, these two functions may be combined such that the cluster table defines a SIL link for the first leg of the route to each egress port from each network device.

The cluster table may be populated using a discovery protocol in a link management layer. For example, each network device may send periodic messages (advertisements) on available ports. Neighboring network devices respond with their node IDs via respective communication links. The map of the topology of the network device cluster may be constructed through the accumulation of these responses at every member network device. In addition, the cluster table may be populated through manual input from an administrator. That is, the network devices may receive the cluster table based on the physical arrangement of the network device cluster.

The network devices may be any combination of routers, switches, bridges, or hubs. The network devices also include forwarding tables. The forwarding table specifies which egress ports of the network device cluster are appropriate for specific destination IP addresses. The forwarding table may be a forwarding information base (FIB) or routing information base (RIB). The higher level routing protocol involving the forwarding lookup is independent from the node vector operations discussed below. The two operations operate without affecting each other.

The network device cluster may receive a packet at any ingress port of any network device. The packet may be a unicast packet destined for one egress port or a multicast packet (multi-destination packet) destined for more than one egress port. In either case, the topology of the network device cluster governs the route the packet will take, within the network device cluster, from the ingress port to the egress port.

The network device that includes the ingress port where the packet arrived from outside the cluster, which may be referred to as the receiving network device, replicates the packet. The receiving network device forwards the replicated packets to local egress ports, if appropriate, and to other network devices, if appropriate, according to the forwarding table. The forwarding table assures that a copy of the packet goes to every network device that includes an appropriate egress port. However, when more than one path exists within the network device cluster to a network device, the destination network device may receive multiple copies of the same packet. The node vector prevents network devices from receiving multiple copies of the same packet or reduces the number of copies that would otherwise be received.

The node vector table specifies an SIL link from each of the network devices for each of the other network devices. Each SIL link is associated with a node vector. The node vector is a bit vector stored in the SIL header of the packet. The node vector has 1 bit for each node in the cluster. If a bit for a particular node is set to 1, the packet is permitted to reach that node by way of the SIL link associated with that node vector. If a bit for a particular node is set to 0, the packet is not permitted to reach that node by way of the SIL link associated with that node vector. The opposite convention may be used.

After performing a lookup with the forwarding table, the network device consults the node vector of the packet before sending it out on the SIL links. Packets are not sent out on SIL links that are not the paths set by the cluster table. Therefore, duplicate copies will not be forwarded to the same node. Exceptions may be made, such as where multiple, but less than all, paths are used for redundancy.

Figure 3A:
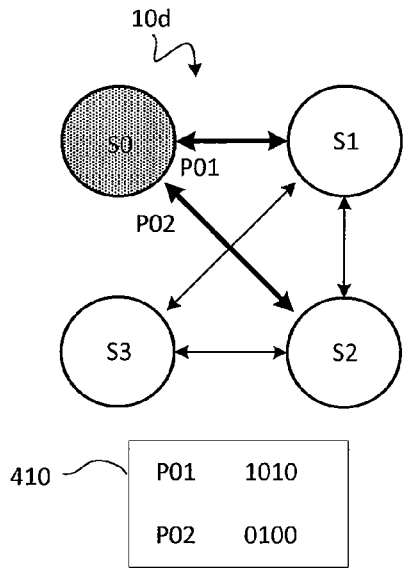
FIGS. 3A-D illustrate the network device cluster of FIG. 1D and a vector table for each of network devices.

FIGS. 3A-D illustrate the network device cluster 10d (see FIG. 1D) and a respective node vector table 410 of each network device. FIG. 3A illustrates the network device cluster 10d and the node vector table 410 for network device S0. The node vectors are specific to the SIL links. Two SIL links (P01, P02) are associated with network device S0. The node vector table 410 of network device S0 includes node vector information for SIL links P01 and P02. The node vector information is in the format {S3, S2, S1, S0}. The node vector may have any length. The length of the node vector corresponds to the number of network devices in the network device cluster.

Figure 3B:
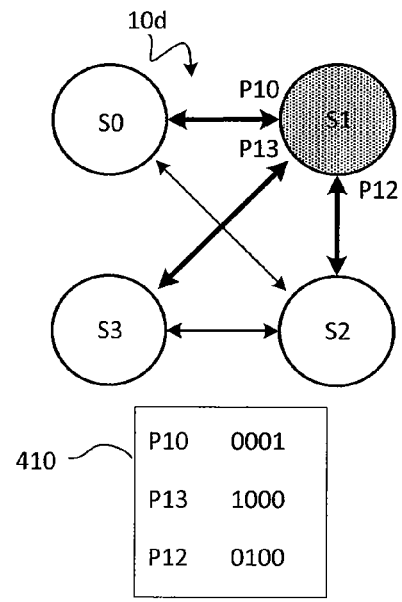
Figure 3C:
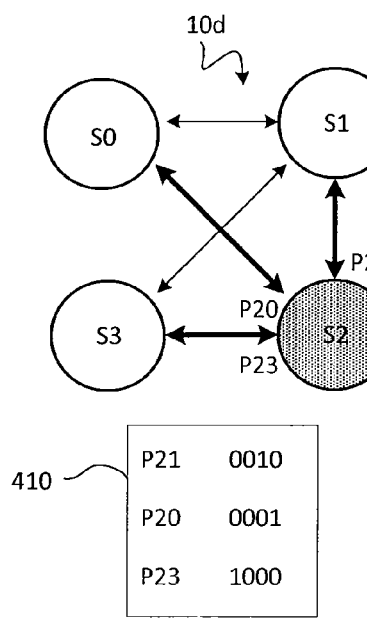
Figure 3D:
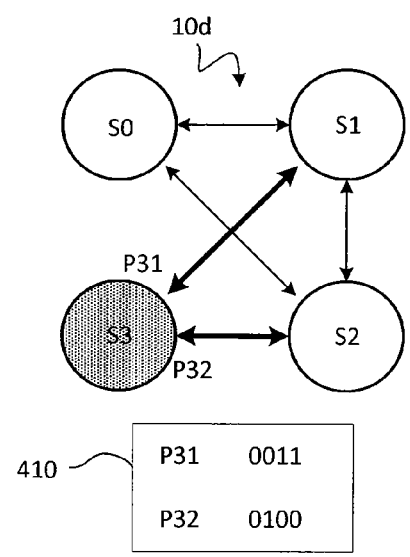

Specifically, in this example, the link P01 is indexed with node vector information 1010 and the link P02 is indexed with node vector information 0100. Any or all of the network devices S0-S3 may store the node vector information for all or a sub-set of the SIL links. FIG. 3B illustrates the network device cluster 10d and the node vector table 410 for network device S1. The link P10 is indexed with node vector information 0001, the link P13 is indexed with node vector information 1000, and the link P12 is indexed with node vector information 0100. FIG. 3C illustrates the network device cluster 10d and the node vector table 410 for network device S2. The link P21 is indexed with node vector information 0010, the link P20 is indexed with node vector information 0001, and the link P23 is indexed with node vector information 1000. FIG. 3D illustrates the network device cluster 10d and the node vector table 410 for network device S3. The link P31 is indexed with node vector information 0011, and the link P32 is indexed with node vector information 0100.

The node vectors are static as long as the topology of the network device cluster does not change. However, when the topology changes based on a transient condition, such as a reconfiguration of the network device cluster, a failed link or node, or another reason, the node vectors are adjusted accordingly. For example, the commander network device may send new node vectors to the member network switches if there are any changes in the topology. The change may result from instructions from an administrator. Alternatively, the change may be based on a detected failure of a link or a node as determined by any of the network devices. The failure may be detected by a network layer protocol, a reachability test, or a utility, such as ping or traceroute. When a failure is reported, the forwarding behavior of the network device cluster may be controlled by changing a few bits in the node vectors without reprogramming the forwarding tables, which involves many more entries.

Figure 4A:
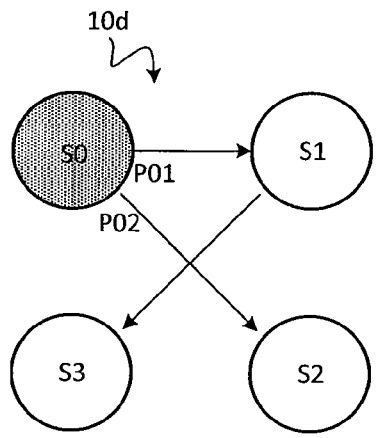
FIGS. 4A-D illustrate example source-based trees for each of the network devices.
Figure 4B:
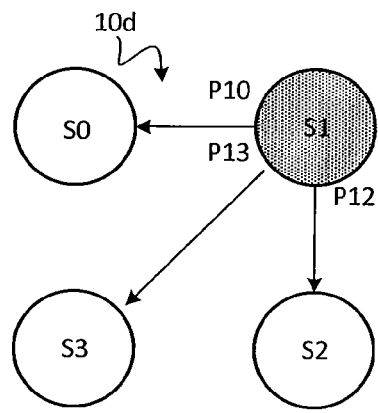
Figure 4C:
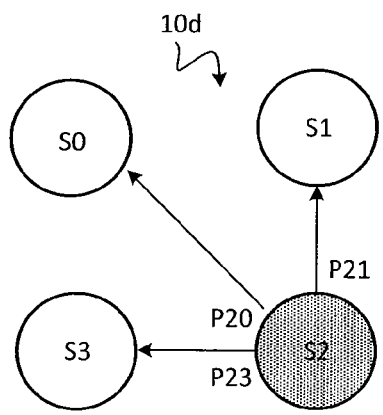
Figure 4D:
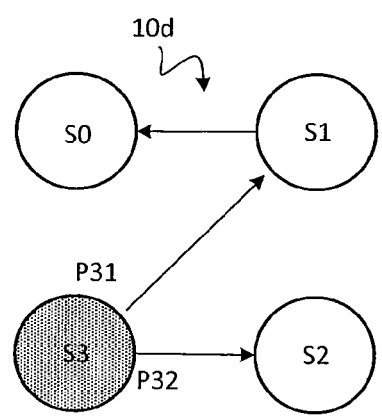

FIGS. 4A-D illustrate source-based trees for each of the network devices of FIGS. 3A-D. Collectively, the source-based trees describe the map of the topology of the network device cluster 10*d*. The source-based trees may be stored in a cluster table at each of the network devices or each network device may store only the specific source-based tree for that network device. FIG. 4A illustrates the source-based tree for node S0. In this example, node S0 uses link P01 to reach node S1 and node S3 and link P02 to reach node S2. Similarly, FIG. 4B illustrates the source-based tree for node S1. In this example, node S1 uses link P10 to reach node S0, link P12 to reach node S2, and link P13 to reach node S3. Further, FIG. 4C illustrates the source-based tree for node S2. In this example, node S2 uses link P20 to reach node S0, link P21 to reach node S1, and link P23 to reach node S3. Finally, FIG. 4D illustrates the source-based tree for node S3. In this example, node S3 uses link P31 to reach node S0 and node S1 and link P32 to reach node S2.

Figure 5:
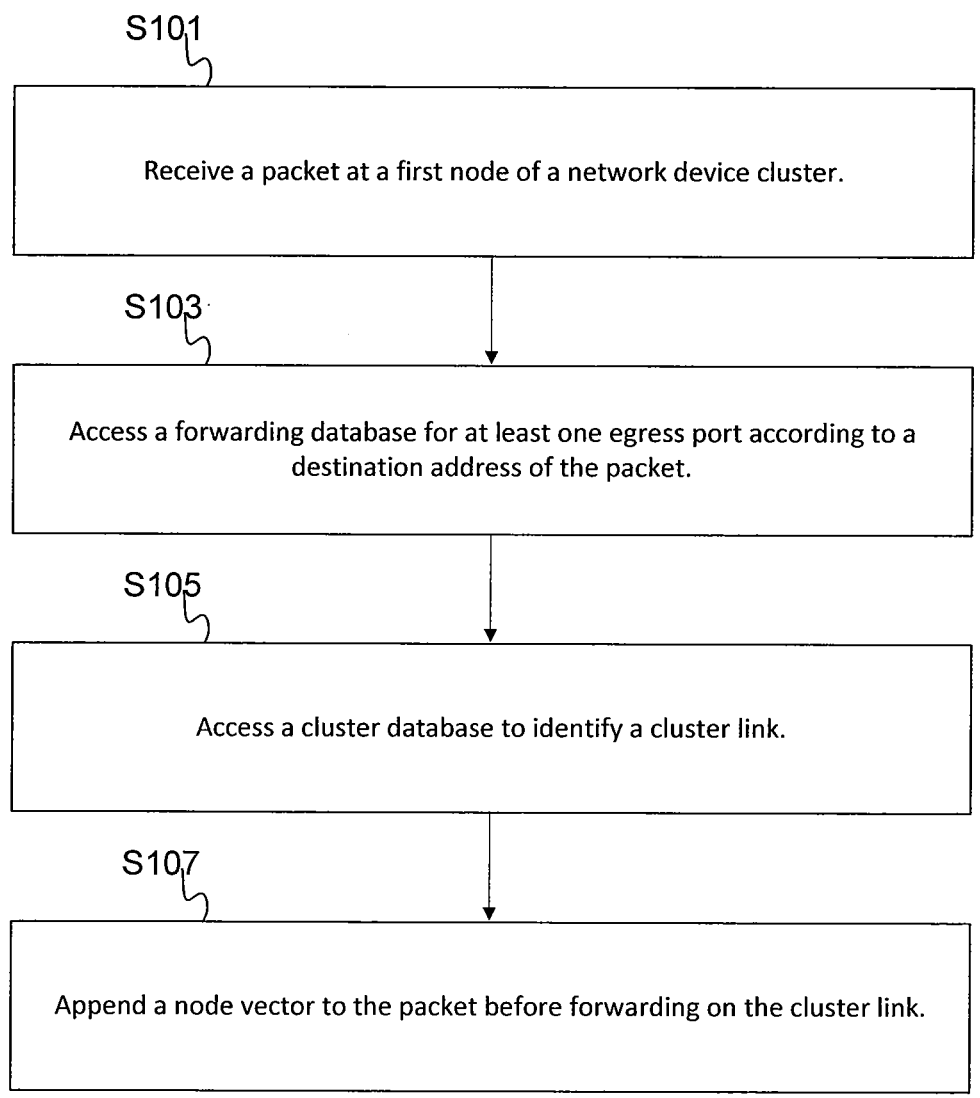
FIG. 5 illustrates a flow chart, according to one embodiment, for packet transport in a receiving network device of the network device cluster.

FIG. 5 illustrates a flow chart for packet transport in the initial or other receiving network device of the network device cluster, such as the cluster described above for FIGS. 1D, 3A and 4A. The receiving network device is the network device having the ingress port that receives the packet from outside of the network device cluster or the originating network device within the cluster. At S101, the receiving network device receives a packet. Any of the network devices may be the receiving network device, depending on the previous hop or source of the packet. The packet includes a payload and a header listing at least a destination address. The destination address may be an Internet protocol (IP) address. At S103, the receiving network device accesses a forwarding database for at least one egress port according to the destination address of the packet. The egress port is a port of a network device in the cluster from which the packet will be routed out of the cluster. The forwarding database may list ports of the network device cluster. Some of the ports may be local to the receiving network device. Others of the ports belong to other network devices of the cluster. The receiving network device replicates the packet for each of the ports associated with the destination IP address in the forwarding table.

At S105, the receiving network device accesses a cluster database to identify an SIL link (cluster link). The cluster database may index the egress ports (as received from the forwarding database) with the appropriate node ID of the network device in a first portion of the cluster database. The cluster database may associate each of the network devices with a cluster link in a second portion of the cluster database. The first portion and the second portion may also be combined into a single lookup from egress port to cluster link.

At S107, the receiving network device appends a node vector to the packet. The node vector may be determined using a node vector table. The node vector table may be stored in the cluster database or a separate database. The node vector table indexes each cluster link with a node vector. The node vectors indicate whether or not a given node is included in the path for the packet. The node vector is a property of the cluster link and does not change based on the destination of the packet. The node vector defines subsequent forwarding of the packet in other nodes. The receiving network device forwards the replicated packets including the node vectors to neighboring nodes.

Figure 6:
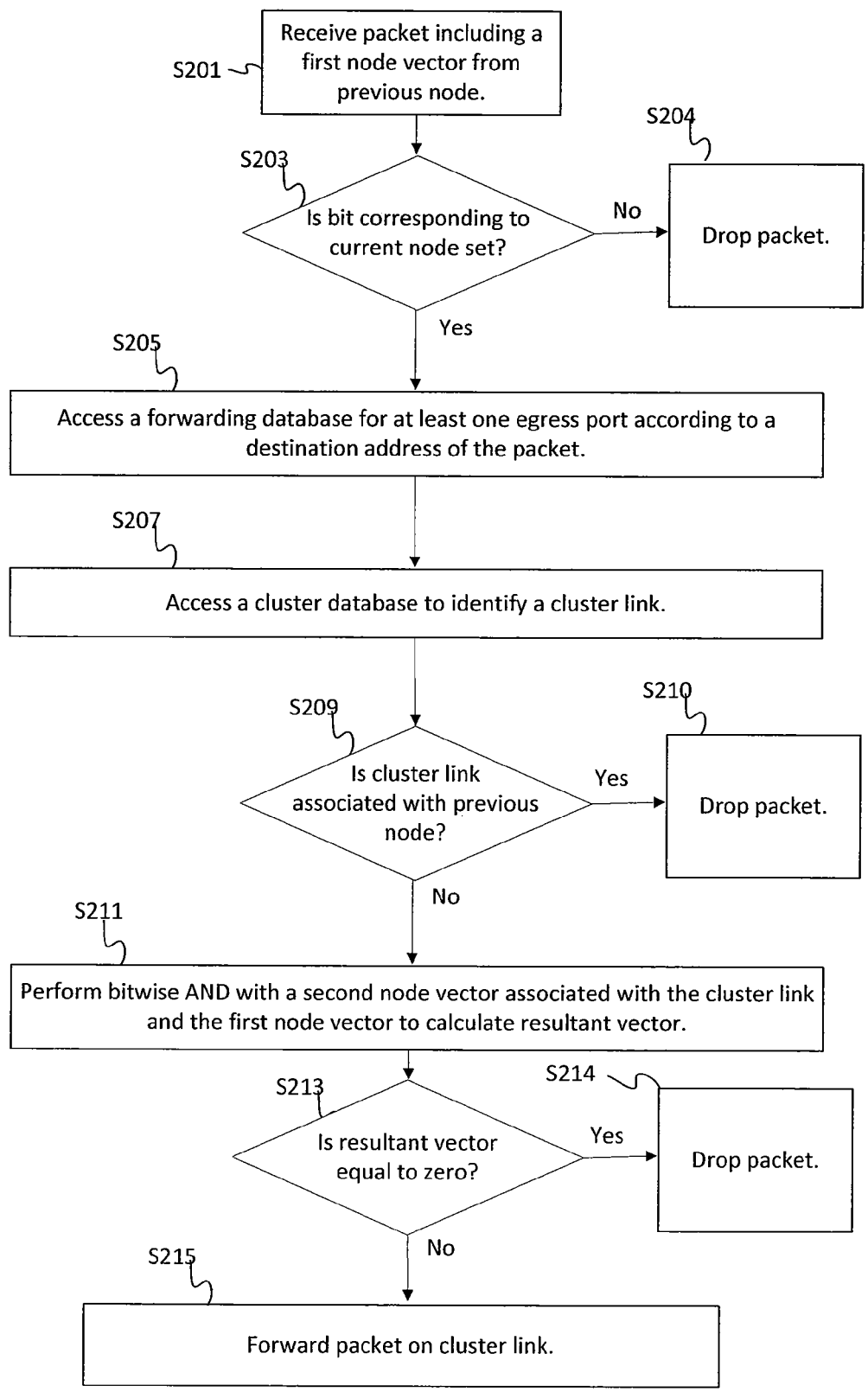
FIG. 6 illustrates a flow chart, according to one embodiment for packet transport in an intermediate network device of the network device cluster.

FIG. 6 illustrates a flow chart for packet transport in an intermediate network device of the network device cluster. The intermediate network device may be any node except the receiving network device, which depends on where in the network device cluster the packet is received. At S201, the intermediate network device receives the packet from the previous node. The packet includes the node vector appended to the packet by the previous node.

At S203, the intermediate network device identifies the bit in the node vector that corresponds to the intermediate network device. If the bit is not set, which indicates that the intermediate network device is not part of a path designated by the cluster database, the packet is dropped at S204. If the bit is set, the intermediate network device proceeds at S205 to access a forwarding database for at least one egress port according to a destination address of the packet. The forwarding database lookup is not affected by the node vector technique. The intermediate network device replicates the packet for each of the egress ports identified by the forwarding database. If any of the egress ports are local to the intermediate network device, those copies are sent out of the network device cluster.

For all egress ports that are not local to the intermediate network device, the intermediate network device accesses a cluster database to identify a cluster link, as shown by S207. The intermediate network device determines at S209 whether the cluster link is associated with the previous node. If the cluster link is associated with the previous node, that replica of the packet is dropped at S210.

For cluster links that are not associated with the previous node, the intermediate network device performs a lookup of the cluster link in the node vector database to determine a second node vector. At S211, the intermediate network device performs a bitwise AND with a second node vector and the node vector received in the packet (first node vector) to determine a resultant node vector. In a bitwise AND, if both bits are 1 then the resultant bit is 1; otherwise, the resultant bit is 0. If every bit of the resultant node vector is zero, the packet is dropped at S214. Otherwise, the intermediate network device forwards the packet on the cluster link, as shown by S215. Steps S207-S215 are repeated, as appropriate, for each of the replicated packets (i.e., for each egress port as defined by the forwarding database).

The intermediate network device may be an egress network device. At an egress node, the forwarding database lookup results in local ports as egress ports but all of the cluster links identified from the cluster database are either associated with the previous node, S209, or associated with nodes that have already been traversed by the packet, S213. In either case, packets associated with those cluster links are dropped, and the copies of the packets associated with the local egress ports are forwarded out of the network device cluster.

The following example illustrates the algorithms of FIGS. 5 and 6. The network device cluster 10*d* of FIGS. 3A-D receives a packet at node S0. Node S0 performs a forwarding database lookup which results in egress ports local to S0 as well as ports in S2 and S3. The cluster database defines that node S0 reaches S1 through link P01, node S0 reaches S3 through link P01, and S0 reaches link S2 through link P02. As shown in FIG. 3A, the node vectors stored in the node vector table 410 at node S0 are P01: 1010 (bits corresponding to nodes S3 and S1 are set) and P02: 0100 (bits corresponding to node S2 is set).

When the packet arrives at node S0, the packet is replicated for each of the local egress ports, and the packet is replicated for each of the links P01 and P02. For the packet that is outbound on link P01, the node vector 1010 is appended to the packet. For the packet that is outbound on link P02, the node vector 0100 is appended to the packet. The packet is forwarded to nodes S1 and S2.

When the packet arrives at node S1, the forwarding database lookup is repeated. A forwarding database lookup again determines that this packet is intended for egress ports on nodes S0, S2, and S3. Node S1 replicates the packet for each of the egress ports. The packet intended to return to node S0 through link P10 will be dropped because link P10 is associated with the previous node (node S0), as shown by S209 in FIG. 6.

The packet replicated for node S2 through link P12 will also be dropped. Node S1 identifies the node vector (first node vector) of the received packet as 1010. Node S1 also accesses the node vector table 410 to determine that the node vector associated with link P12 (second node vector) is 0100, as shown in FIG. 3B. Node S1 performs a bitwise AND operation between the first node vector and the second node vector to calculate a resultant vector. In a bitwise AND if both bits are 1 then the resultant bit is 1; otherwise, the resultant bit is 0. In this case, the resultant vector is zero (R=1010 & 0100=0000). Because the resultant vector is zero, the network device drops the corresponding copy of the packet.

The packet replicated for node S3 through link P13 will not be dropped. Node S1 identifies the node vector (first node vector) of the received packet as 1010. Node S1 also accesses the node vector table 410 to determine that the node vector associated with link P13 (second node vector) is 1000, as shown in FIG. 3B. Node S1 performs a bitwise AND operation between the first node vector and the second node vector to calculate a resultant vector (R=1010 & 1000=1000). Because 1000 is not equal to zero, the packet is not dropped. Instead, node S1 forwards the packet on link P13 to node S3 after replacing the previous node vector with the resultant node vector 1000.

The packet that arrives at node S3 will be forwarded using the egress ports local to node S3. Node S3 will determine whether the bit in the node vector corresponding to node S3 is set. In this case, the node vector is 1000, and the bit that corresponds to node S3 is set. Therefore, node S3 will not drop the packet. Instead, a forwarding database lookup at node S3 determines that this packet is also intended for egress ports on nodes S0 and S2. Node S3 replicates the packet for each egress port. The replicated packets associated with the egress ports local to node S3 are forwarded. The replicated packed destined for S0 through link P31 is dropped because link P31 is associated with the previous node.

The packet replicated for node S2 through link P32 is dropped. Node S3 identifies the node vector (first node vector) of the received packet as 1000. Node S3 also accesses the node vector table 410 to determine that the node vector associated with link P32 (second node vector) is 0100, as shown in FIG. 3D. Node S3 performs a bitwise AND operation between the first node vector and the second node vector to calculate a resultant vector (R=1000 & 0100=0000). Because the resultant vector is equal to zero, the packet is dropped.

When the packet that arrives at node S2 from node S0, a forwarding database lookup again determines that this packet is intended for egress ports on nodes S0, S2, and S3. Node S2 replicates the packet for each of the egress ports. Node S2 forwards the packet using the ports local to S2. The packet intended to return to node S0 through link P20 will be dropped because link P20 is associated with the previous node (node S0).

The packet replicated for node S3 through link P23 is dropped. Node S2 identifies the node vector (first node vector) of the received packet as 0100. Node S2 accesses the node vector table 410 to determine that the node vector (second node vector) associated with link P23 is 1000, as shown in FIG. 3C. Node S2 performs a bitwise AND operation between the first node vector and the second node vector to calculate a resultant vector. The resultant vector is zero (R=0100 & 1000=0000). Because the resultant vector is zero, the network device drops the corresponding copy of the packet.

The packet replicated for node S1 through link P21 is also dropped. Node S2 identifies the node vector (first node vector) of the received packet as 0100. Node S2 accesses the node vector table 410 to determine that the node vector (second node vector) associated with link P21 is 0010, as shown in FIG. 3C. Node S2 performs a bitwise AND operation between the first node vector and the second node vector to calculate a resultant vector. The resultant vector is zero (R=0100 & 0010=0000). Because the resultant vector is zero, the network device drops the corresponding copy of the packet.

Figure 7:
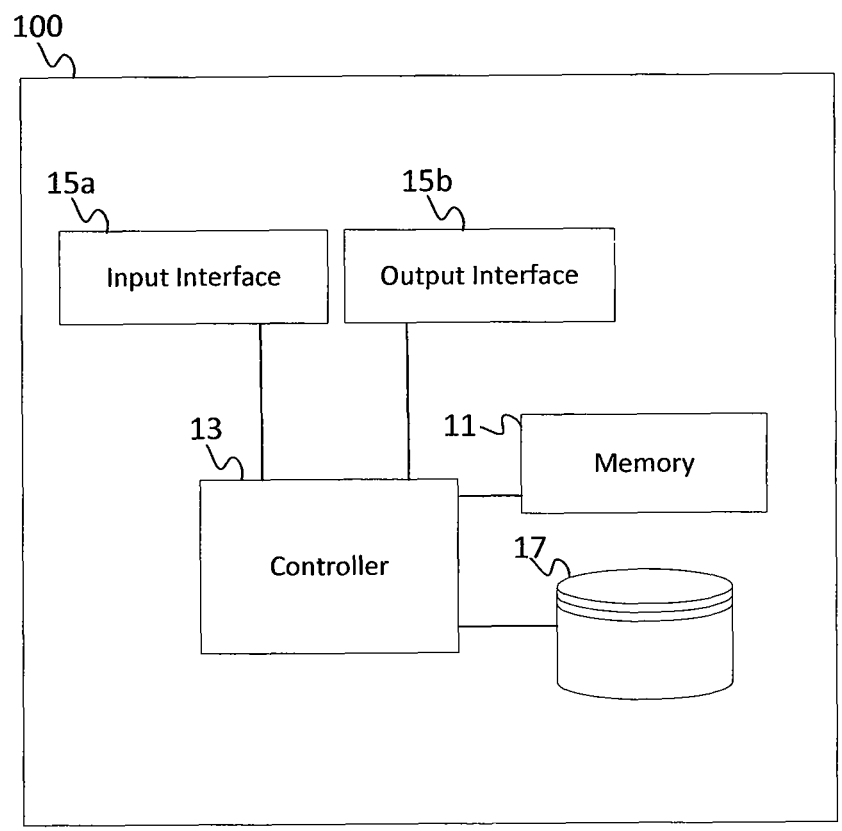
FIG. 7 illustrates a block diagram of any of the network devices of FIGS. 1-4.

FIG. 7 illustrates a block diagram of a network device 100. The network device 100 may be any of the network devices of the network device cluster as shown in FIGS. 1-4 the network device 100 includes a memory 11, a controller 13, a database 17, and a communication interface 15.

The input communication interface 15a includes an ingress port of the network device 100 (and the network device cluster) that is configured to receive a packet including a destination address. The database 17 stores the cluster database, the forwarding database, and the node vector table. The controller 13 accesses the database 17 first as a forwarding database to determine the egress ports for the packet and second as a cluster database to determine the cluster links associate with each of the egress ports. The output communication interface 15b of each network device includes the egress ports.

The controller 13 replicates the packet for each of the egress ports and inserts a node vector into each of the replicated packets. The node vector is a bit mapped vector where each bit corresponds to each other member network device of the network device cluster. The node vector determines subsequent forwarding nodes of the network device cluster.

The controller 13 is also configured to drop packets in certain circumstances according to the node vectors of received packets. The controller 13 performs a bitwise operation on a first node vector extracted from a received packet and a second node vector associated with the cluster link determined from the cluster database in order to calculate the resultant vector. The controller 13 drops the packet if a logical operation of every bit of the first node vector and a corresponding bit in the second node vector results in a zero and forwards the packet if the logical operation of any bit of the first node vector and the corresponding bit in the second node vector does not result in zero.

The database 17 may be external to network device 100 or incorporated within the network device 100. The database 17 may be stored with memory 11 or separately. The database 17 may be implemented as either hardware or software.

The memory 11 may be any known type of volatile memory or a non-volatile memory. The memory 11 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory.

The memory 11 may store computer executable instructions. The controller 13 may execute computer executable instructions. The computer executable instructions may be included in computer code. The computer code may be stored in the memory 11. The computer code may be written in any computer language, such as C, C++, C#, Java, Pascal, Visual Basic, Perl, HyperText Markup Language (HTML), JavaScript, assembly language, extensible markup language (XML) and any combination thereof. The computer code is encoded in one or more tangible media or one or more non-transitory tangible media for execution by the controller 13.

The instructions may be stored on any computer readable medium. A computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 13 may include a general processor, digital signal processor, application specific integrated circuit, field programmable gate array, analog circuit, digital circuit, server processor, combinations thereof, or other now known or later developed processor. The controller 13 may be a single device or combinations of devices, such as associated with a network or distributed processing. Any of various processing strategies may be used, such as multi-processing, multi-tasking, parallel processing, remote processing, centralized processing or the like. The controller 13 may be responsive to or operable to execute instructions stored as part of software, hardware, integrated circuits, firmware, microcode or the like. The functions, acts, methods or tasks illustrated in the figures or described herein may be performed by the controller 13 executing instructions stored in the memory 11. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The I/O interface(s) 15a-b may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection. For example, the I/O interface(s) 15a-b may include a first communication interface devoted to sending data, packets, or datagrams and a second communication interface devoted to receiving data, packets, or datagrams. Alternatively, the I/O interface(s) 15a-b may be implemented using a single communication interface.

The communication links 20 may be any protocol or physical connection that is used to couple a server to a computer. The communication paths 30a-e may utilize Ethernet, wireless, transmission control protocol (TCP), internet protocol (IP), or multiprotocol label switching (MPLS) technologies.

As used herein, the phrases "in communication" and "coupled" are defined to mean directly connected to or indirectly connected through one or more intermediate components. Such intermediate components may include both hardware and software based components.

Various embodiments described herein can be used alone or in combination with one another. The foregoing detailed description has described only a few of the many possible implementations of the present invention. For this reason, this detailed description is intended by way of illustration, and not by way of limitation.

We claim:

1. A method comprising:

receiving a packet at a node of a network device cluster, wherein the network device cluster comprises a plurality of nodes and the network device cluster operates as a single logical entity;

making a replica of the packet, the replica of the packet corresponds to an egress port associated with a destination address of the packet;

accessing a cluster database to identify a cluster link associated with the egress port;

accessing a node vector table to identify a first node vector, the first node vector associated with the cluster link;

extracting a second node vector from the packet;

calculating a resultant node vector based on the first node vector and the second node vector, and the resultant node vector corresponds to the cluster link over which the replica of the packet is to be forwarded;

replacing the second node vector in the replica of the packet with the resultant node vector; and forwarding the replica of the packet within the network device cluster based on the resultant node vector.

2. The method of claim 1, wherein the node is a receiving node that received the packet from outside of the network device cluster, the method comprising:

appending the first node vector to the replica of the packet; and forwarding the replica of the packet to an intermediate node associated with the cluster link.

3. The method of claim 1, wherein the node is an intermediate node that received the packet from within the network device cluster, the intermediate node drops the packet if a bit corresponding to the intermediate node in the second node vector is zero.

4. The method of claim 1, further comprising:

performing a bitwise operation on the first node vector and the second node vector to calculate the resultant node vector;

dropping the replica of the packet if every bit of the resultant node vector is zero; and forwarding the replica of the packet if any bit of the resultant node vector is not zero.

5. The method of claim 1, wherein the node is an intermediate node that received the packet from a previous node within the network device cluster, the method further comprising:

dropping the replica of the packet if the cluster link is associated with the previous node.

6. The method of claim 1, further comprising:

forwarding the replica of the packet to an egress node with the resultant node vector appended to the replica of the packet to eliminate loops in the network device cluster.

7. The method of claim 1, further comprising:

modifying the resultant node vector according to a transient condition indicative of a change in a topology of the network device cluster.

8. The method of claim 1, wherein the cluster database stores a plurality of source based trees of the network device cluster.

9. The method of claim 1, wherein a topology of the network device cluster includes a plurality of paths within the network device cluster from a node in the network device cluster to an egress node.

10. A network device comprising:
- an ingress port of a network device cluster configured to receive a packet including a destination address; and
- a controller configured to:
  - access a forwarding database to determine an egress port for the packet,
  - replicate the packet to have a replica of the packet corresponding to the egress port,
  - access a node vector table to identify a first node vector associated with a cluster link wherein the cluster link indicates a series of nodes within the network device cluster the replica has to travel to reach the egress port,
  - replace a second node vector of the replica with a resultant node vector, wherein the resultant node vector corresponds to the replica and the resultant node vector is calculated based on the first node vector and the second node vector, and
  - forward the replica of the packet to the corresponding egress port.

11. The network device of claim 10, wherein the network device is a receiving node that received the packet from outside of the network device cluster.

12. The network device of claim 10, wherein the network device is an intermediate node of the network device cluster, and
- wherein the controller is configured to perform a bitwise operation on the first node vector and the second node vector to calculate the resultant node vector.

13. The network device of claim 12, wherein the controller is configured to drop the replica of the packet if the bitwise operation results in a zero and the controller is further configured to forward the replica of the packet if the bitwise operation does not result in zero.

14. The network device of claim 10, wherein the network device is an intermediate node that received the packet from a previous node, and
- wherein the controller is configured to drop the packet if the cluster link is associated with the previous node to avoid loops in the network device cluster.

15. The network device of claim 10, wherein the controller is configured to modify a cluster database according to a reported failure, wherein the cluster database is configured to index a cluster link associated with an egress port.

16. The network device of claim 10, wherein a cluster database stores a plurality of source based trees of the network device cluster.

17. The network device of claim 10, wherein the network device is a switch and the network device cluster is a virtual switch formed from a plurality of switches operating as a single logical unit.

18. The method of claim 1 wherein the first node vector is independent of the destination address of the packet and the first node vector is independent of a packet forwarding protocol used to transfer the packet from a source network device to a destination network device.

19. The network device of claim 10 wherein the first node vector is independent of the destination address and the first node vector is independent of a packet forwarding protocol used to transfer the packet from a source device to a destination device.

* * * * *